(12) United States Patent
Bayer et al.

(10) Patent No.: US 8,178,797 B2
(45) Date of Patent: May 15, 2012

(54) HERMETICALLY SEALED SCALE PLATFORM

(75) Inventors: Jason Bayer, Columbus, OH (US);
Michael Perrea, Columbus, OH (US);
Thomas S. Rice, Columbus, OH (US);
Pete Wyman, Logan, OH (US);
Anthony Ticknor, Hilliard, OH (US)

(73) Assignee: Mettler-Toledo, LLC, Columbus, OH (US)

( * ) Notice: Subject to any disclaimer, the term of this patent is extended or adjusted under 35 U.S.C. 154(b) by 238 days.

(21) Appl. No.: 12/650,177

(22) Filed: Dec. 30, 2009

(65) Prior Publication Data

US 2011/0155476 A1 Jun. 30, 2011

(51) Int. Cl.
*G01G 21/28* (2006.01)
(52) U.S. Cl. .......................... 177/132; 177/238; 177/262
(58) Field of Classification Search .......... 177/132–134, 177/238–244, 262, 263
See application file for complete search history.

(56) References Cited

U.S. PATENT DOCUMENTS

| | | | |
|---|---|---|---|
| 2,384,157 A | 9/1945 | Burke | |
| 3,427,706 A | 2/1969 | Jaffee | |
| 3,874,229 A | 4/1975 | Ormond | |
| 3,935,913 A * | 2/1976 | Wagner et al. | 177/134 |
| 4,134,467 A | 1/1979 | Czyryk | |
| 4,203,497 A | 5/1980 | Harris et al. | |
| 4,225,022 A | 9/1980 | Belart | |
| 4,304,821 A | 12/1981 | Hayase et al. | |
| 4,350,218 A | 9/1982 | Söderholm | |
| 4,396,079 A | 8/1983 | Brendel | |
| 4,453,606 A * | 6/1984 | Mokhbery et al. | 177/126 |
| 4,679,643 A | 7/1987 | Bové | |
| 4,685,526 A | 8/1987 | Holm | |
| 4,739,848 A | 4/1988 | Tulloch | |
| 4,750,577 A | 6/1988 | Häfner | |
| 4,800,973 A | 1/1989 | Angel | |
| 4,813,504 A * | 3/1989 | Kroll | 177/21 |
| 4,886,133 A * | 12/1989 | Horn et al. | 177/211 |
| 4,979,581 A | 12/1990 | Kroll | |
| 5,300,367 A | 4/1994 | Bodart et al. | |
| 5,359,153 A | 10/1994 | Herrmann et al. | |
| 5,487,930 A | 1/1996 | Lockshaw et al. | |
| 5,869,788 A * | 2/1999 | Gordon et al. | 177/124 |
| 6,177,638 B1 | 1/2001 | Murray | |
| 6,222,137 B1 | 4/2001 | Handford | |
| 6,433,289 B1 * | 8/2002 | Gurr | 177/238 |
| 6,706,976 B1 | 3/2004 | Schuler | |
| 7,048,175 B2 | 5/2006 | Runyan | |
| 7,119,287 B2 | 10/2006 | Kroll et al. | |
| 7,180,016 B2 | 2/2007 | Gebert | |
| 7,339,123 B2 * | 3/2008 | Yamashita | 177/238 |
| 7,348,501 B1 | 3/2008 | Nugent, Jr. | |
| 7,411,137 B2 | 8/2008 | Sandberg et al. | |
| 7,434,481 B2 * | 10/2008 | Hawes et al. | 73/862.391 |

* cited by examiner

*Primary Examiner* — Randy W Gibson
(74) *Attorney, Agent, or Firm* — Standley Law Group LLP (57) ABSTRACT

A hermetically sealed scale for use in a weighing scale. A scale of the present invention may include a load receiving plate and a bottom plate, between which is sandwiched a supporting rib structure that preferably includes a plurality of perimeter members that form sealed upright sides of the scale. The supporting rib structure, load receiving plate and bottom plate cooperate to form a substantially rigid and hermetically sealed sandwich structure. The load receiving plate may be joined to the supporting rib structure by perimeter welding or another bonding technique that permits the joining material to be subsequently shaped to form a smooth transition between the load receiving plate and the perimeter members of the scale.

20 Claims, 6 Drawing Sheets

HERMETICALLY SEALED SCALE PLATFORM

BACKGROUND

The present invention is directed to a scale for use in a weighing device for weighing objects of interest. More particularly, the present invention is directed to a scale having a scale platform of hermetically sealed design and construction.

Weighing devices (e.g., scales) for weighing objects of interest are used in a multitude of different settings and industries. Among many other things, scales are commonly used to weigh packages to be shipped, goods such as chemicals or pharmaceuticals, and food products. Scales may be provided in various forms and sizes to meet these varying needs.

As would be known to one of skill in the art, at least certain industries require devices such as scales to be hygienic in nature. For example, and without limitation, both the food and pharmaceutical industries often require that associated manufacturing/processing equipment (including scales or portions thereof) be of hygienic design and construction. Such a requirement may have multiple purposes, such as the need to prevent contamination of the product(s) being manufactured and/or to facilitate cleaning of the associated equipment. The latter consideration may be particularly relevant in the food industry.

To this end, various hygienic scale designs have been attempted—but all have suffered from various shortcomings. These shortcomings have included, but are not limited to, difficulties associated with construction and/or maintenance, high cost, and ease of cleaning. The present invention overcomes these past deficiencies.

SUMMARY OF THE OF THE GENERAL INVENTIVE CONCEPT

The present invention is directed to a scale having a scale platform employing a hermetically sealed sandwich structure that renders it suitable for hygienic applications. The scale platform may be associated with one or more load cells or other weight indicating devices for providing a weight reading of an object placed on the platform. The scale platform may be associated with other components, such as an indicator or other user interface, to form a complete scale. Such other scale components may be located remotely from the scale platform.

A scale platform of the present invention preferably utilizes a unitized construction so as to provide the stiffness necessary for accurate weighing. Exemplary embodiments of a scale platform of the present invention will generally therefore include an upper load receiving plate, a supporting rib structure that includes interior ribs and perimeter members, and a bottom panel.

Whatever the particular design, however, a scale platform of the present invention is of hermetically sealed construction, which allows a scale employing the scale platform to meet the sanitary (hygienic) requirements of the food industry and other industries in which it may be used. The hygienic nature of a scale platform of the present invention is preferably enhanced by providing a smooth transition between the load receiving plate and the platform side walls. Such a smooth transition may be accomplished by perimeter welding the load receiving plate to specially contoured perimeter members and subsequently blending the welds accordingly.

The bottom panel may be attached to the interior rib structure by various techniques, including welding and adhesive bonding.

BRIEF DESCRIPTION OF THE DRAWINGS

In addition to the features mentioned above, other aspects of the present invention will be readily apparent from the following descriptions of the drawings and exemplary embodiments, wherein like reference numerals across the several views refer to identical or equivalent features, and wherein.

DETAILED DESCRIPTION OF THE EXEMPLARY EMBODIMENT(S)

Figure 1:
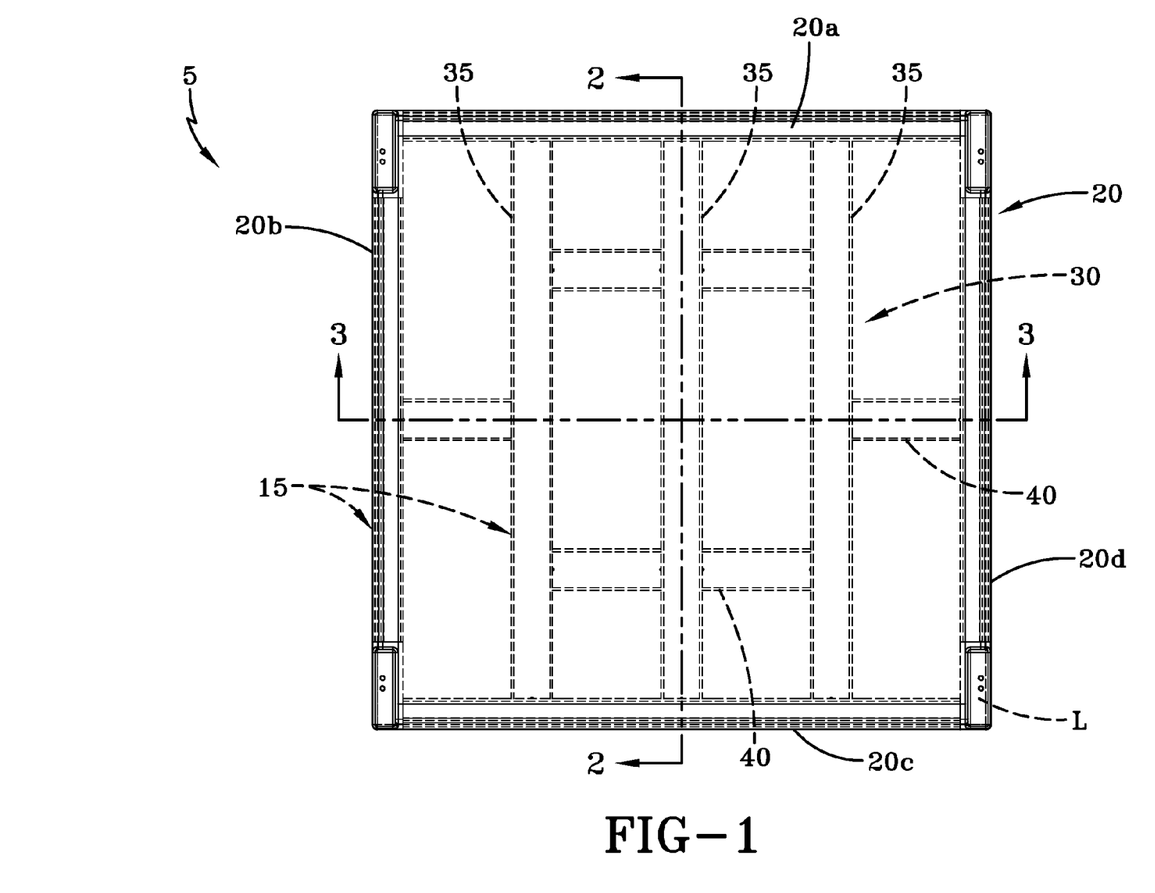
FIG. 1 is a top plan view of one exemplary embodiment of a low-profile hermetically sealed scale platform of the present invention.
Figure 2:
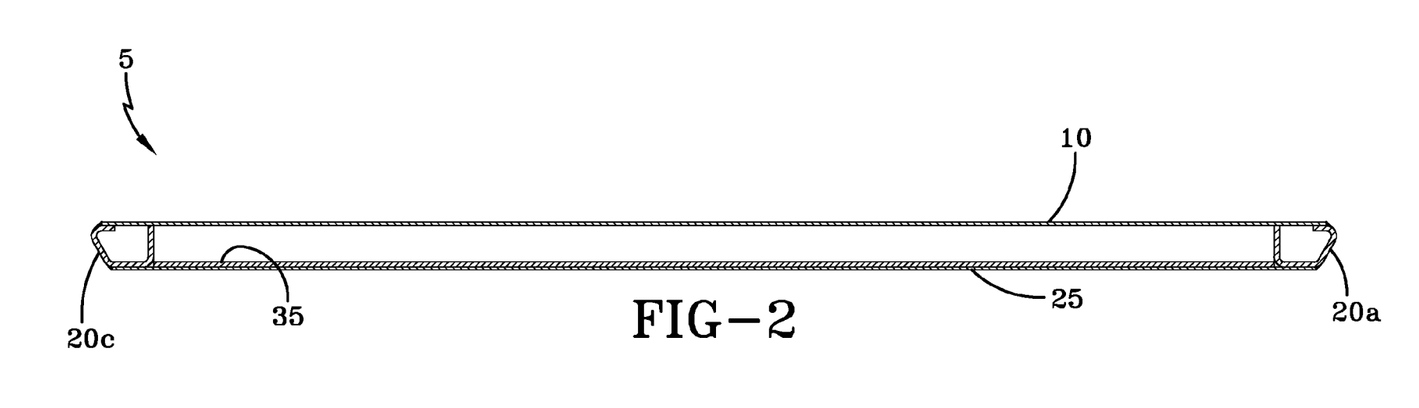
FIG. 2 is a section view taken along line 2-2 of FIG. 1.
Figure 3:
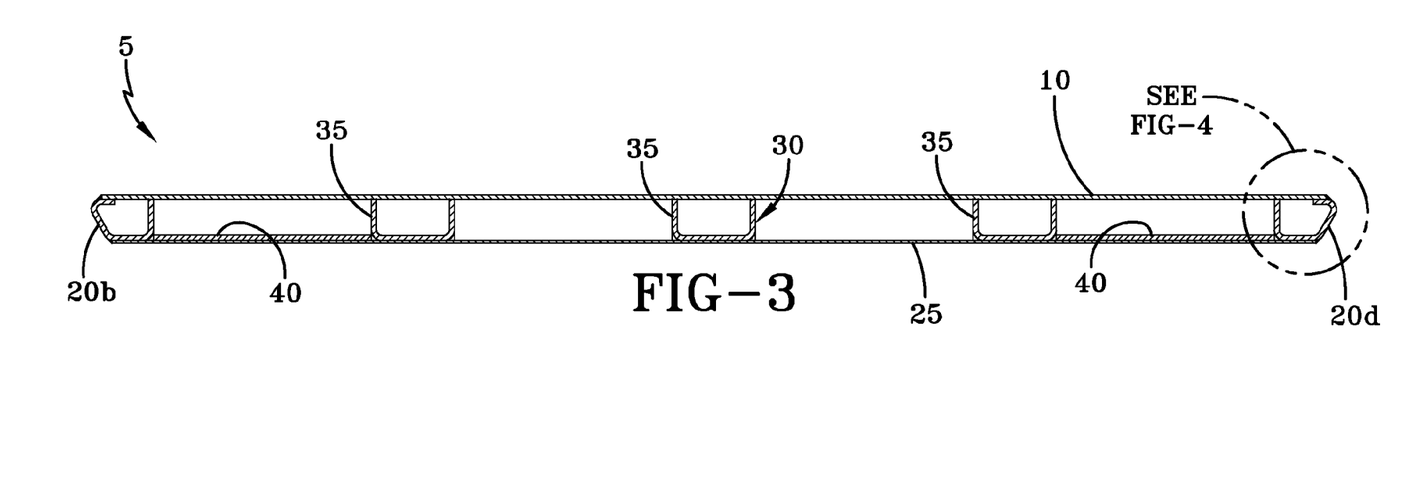
FIG. 3 is a section view taken along line 3-3 of FIG. 1.

One exemplary embodiment of a hermetically sealed scale platform 5 (hereafter "platform") of the present invention is illustrated in FIGS. 1-3. As shown, the platform 5 employs a unitized and hermetically sealed sandwich structure having an upper load receiving plate 10, a supporting rib structure 15 that includes interior ribs 30, perimeter members 20, and a bottom plate 25. The platform 5 may rest on a plurality of load cells L (see FIG. 1) or other weight indicating devices familiar to one of skill in the art in order to form a scale that is able to determine the weight of an object placed on the load receiving plate 10.

In this particular embodiment, the platform 5 forms a quadrilateral and, therefore, includes four perimeter members 20*a*-20*d* as shown. The perimeter members 20 may be joined at their ends (or by their ends to load cell mounting elements—see below) to form the sides of the platform 5. The method used to connect the ends of the perimeter members 20 should ensure a sealed joint. In the particular example shown herein, the perimeter members are joined by welding. However, as described below, other joining techniques may also be employed.

The remainder of the supporting rib structure 15 is comprised of a series of interior ribs 30 that extend within the space defined by the upper and lower plates 10, 25 and the perimeter members 20. In this particular example, the interior ribs 30 include three main rib members 35 that extend between opposite perimeter members 20*a*, 20*c*, as well as a number of auxiliary rib members 40 that help to strengthen the platform 5. In this exemplary embodiment, auxiliary rib members 40 can be seen to extend between the main rib members 35, and between the main rib members and two of the perimeter members 20*b*, 20*d*.

As shown, these particular support ribs 30 comprise sections of C-channel that are welded together at their mutual points of contact, and with associated perimeter members, so as to form a substantially rigid supporting rib structure 15. While the use of C-channel is shown, it may also be possible to construct a scale according to the present invention using other structural shapes. For example, rectangular tubing or L-channel (angle) may be substituted for the C-channel in other embodiments of the present invention. It should be realized, however, that such a substitution of materials may affect the weight and/or structural rigidity/stiffness of the associated scale.

As would therefore be clearly realized by one of skill in the art, the interior ribs 30 of a platform of the present invention may vary from the structure, quantity, design, arrangement and/or orientation shown. Consequently, nothing herein is to be interpreted as limiting the scope of the present invention to the particular interior rib structure shown and described with respect to the exemplary embodiments of FIGS. 1-7. Rather, as long as the interior rib structure imparts sufficient strength and rigidity thereto, a platform of the present invention may be provided with a variety of interior rib configurations. Such configurations may depend on, for example, the size of the platform and the magnitude of the loads to which it will be subjected.

While the cross-sectional shape of the interior rib members 30 may vary considerably, the cross-sectional shape of the perimeter members 20 is preferably of a contoured shape that facilitates the subsequent blending and polishing of perimeter welds (or other perimeter bonds) used to seal at least the upper load receiving plate 10 to the perimeter members. As can be best observed in FIG. 4, the perimeter members 20 of this particular platform 5 comprise channel sections having such a cross-sectional shape. Like the C-channel discussed above, the perimeter members 20 are shown to have a pair of spaced and opposed legs 45, 50 connected by a joining leg 55. Based on the orientations shown herein, the spaced and opposed legs may be referred to as vertical legs and the joining leg may be referred to as a horizontal leg for purposes of identification. Other orientations are possible in other embodiments.

Figure 4:
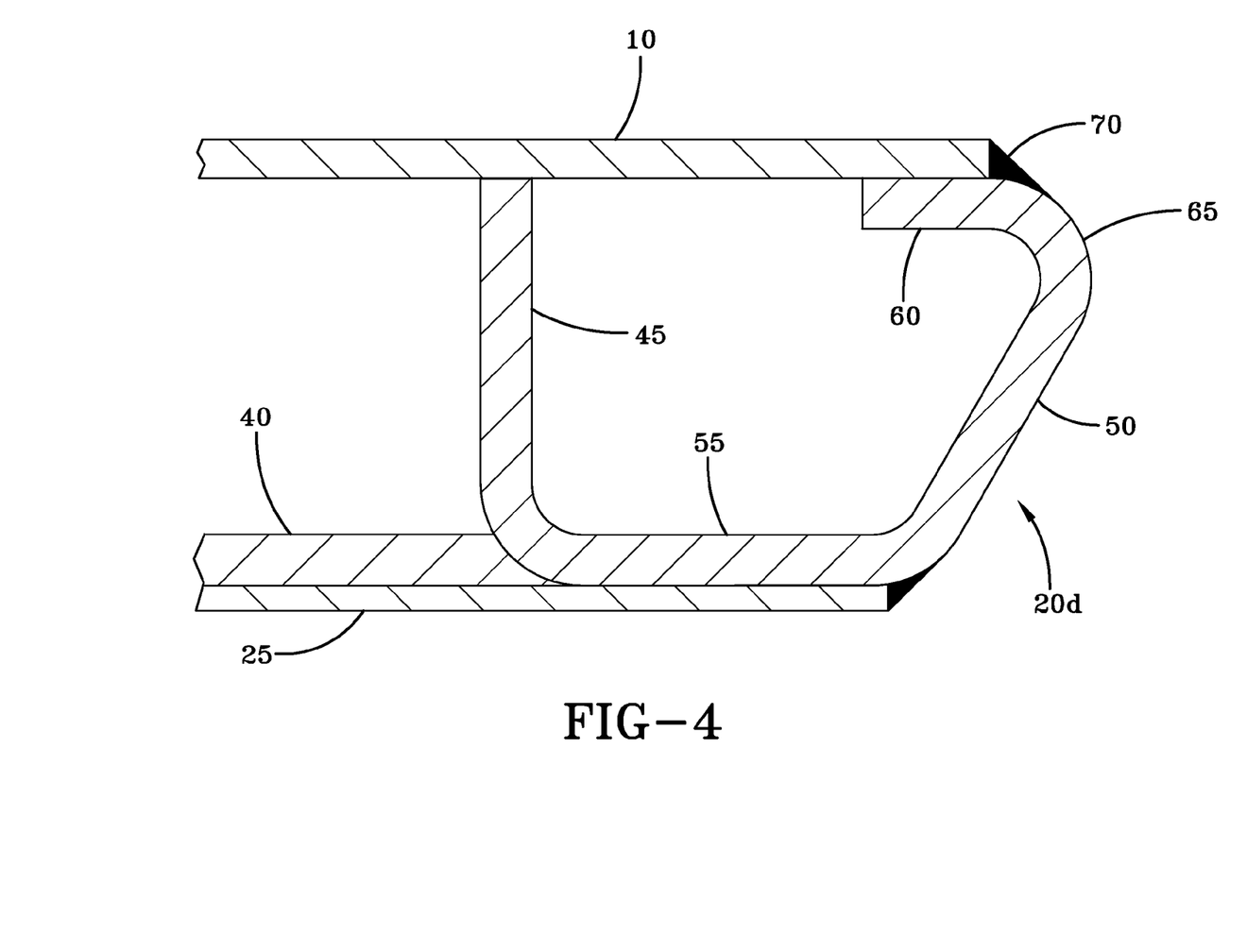
FIG. 4 is an enlarged detail view of a portion of the scale platform as indicated in FIG. 3.

Unlike the C-channel, however, the perimeter members 20 of this embodiment include at least a partial secondary horizontal leg 60 that extends inward from the upper end of the outer vertical leg 50. As shown, the secondary horizontal leg 60 of this embodiment is created by inwardly bending the free end of the outer vertical leg 50. This bend is preferably of a radius that provides the platform with a rounded perimeter edge 65. Although not shown herein, the secondary horizontal leg 60 could extend to, or extend nearer to, the inner vertical leg 45.

The perimeter members 20 of this exemplary embodiment also include an outer vertical leg 50 that diverges from the inner vertical leg 45. Particularly, the perimeter members 20 of this particular embodiment include outer vertical legs 50 that angle inward from the bend at the secondary horizontal leg 60 toward the horizontal joining leg 55 and bottom plate 25. Thus, the perimeter of the platform 5 is provided with an angular shape that further facilitates cleaning and reduces the likelihood of contamination. The outer vertical leg 50 of other embodiments may not diverge from the inner vertical leg 45. For example, in other embodiments, the outer vertical leg and inner vertical leg of the perimeter members may be substantially parallel.

In any case, the secondary horizontal legs 60 of the perimeter members 20 provide perimeter support for the upper load receiving plate 10 and serve as an attachment surface for the edges thereof. Preferably, the upper load receiving plate 10 overlaps the secondary horizontal legs 60 of the perimeter members 20. More preferably, the upper load receiving plate 10 overlaps the secondary horizontal legs 60 of the perimeter members 20 as illustrated in FIG. 4. That is, it is preferred that the overlap of the upper load receiving plate 10 be sufficient to facilitate the blending and smoothing of a joining material 70 into the rounded perimeter edge 65 of the platform 5.

As illustrated, the bonding material 70 of this particular embodiment is a fillet weld, which functions to join and seal the edges of the upper load receiving plate 10 to the secondary horizontal legs 60 of the perimeter members 20. In other embodiments, the bonding material may be an epoxy or other adhesive that can serve the same purpose and that allows for the subsequent shaping thereof.

Once the load receiving plate 10 has been attached to the secondary horizontal legs 60 of the perimeter members 20 as described above, the welds or other bonding materials are preferably smoothed and blended into the radiused bends in the perimeter members. The resulting combination of the rounded perimeter edge 65 and its smooth transition to the edges of the upper load receiving plate 10 eliminates crevices and reduces the ability of materials to cling to the platform 5, which thereby facilitates its cleaning and minimizes the chances of product contamination.

The bottom plate 25 may be attached to the supporting rib structure 15 by a variety of joining techniques. For example, the bottom plate 25 may be attached to the interior ribs 30 by plug welding and/or another welding process. Alternatively, or in addition to being welded to the interior ribs 30, the bottom plate 25 of this embodiment is also shown to be welded along its edges to the bottom surface of the perimeter members 20. As described above with respect to attachment of the load receiving plate 10, this perimeter weld acts to hermetically seal the platform 5 from contaminant intrusion through any gaps that might otherwise exists between the bottom plate 25 and the supporting rib structure 15. Preferably, these perimeter welds are subsequently smoothed and blended into the curvature of the perimeter members 20, which further eliminates crevices and reduces the ability of materials to cling to the platform 5.

In alternative embodiments of the present invention, the bottom plate of a platform may be adhesively bonded to the supporting rib structure thereof. Preferably, any adhesive used for this purpose is of sufficient strength to ensure secure attachment, is resistant to any materials (including cleaning materials) to which the platform may be exposed, and is capable of providing a hermetic seal between the bottom plate and its points of attachment to the supporting rib structure. Preferably, any such adhesive is also capable of being smoothed and blended, as described above. In yet other embodiments of the present invention, the bottom plate 25 may be joined to the rib structure by a combination of welding and adhesive bonding.

Figure 5:
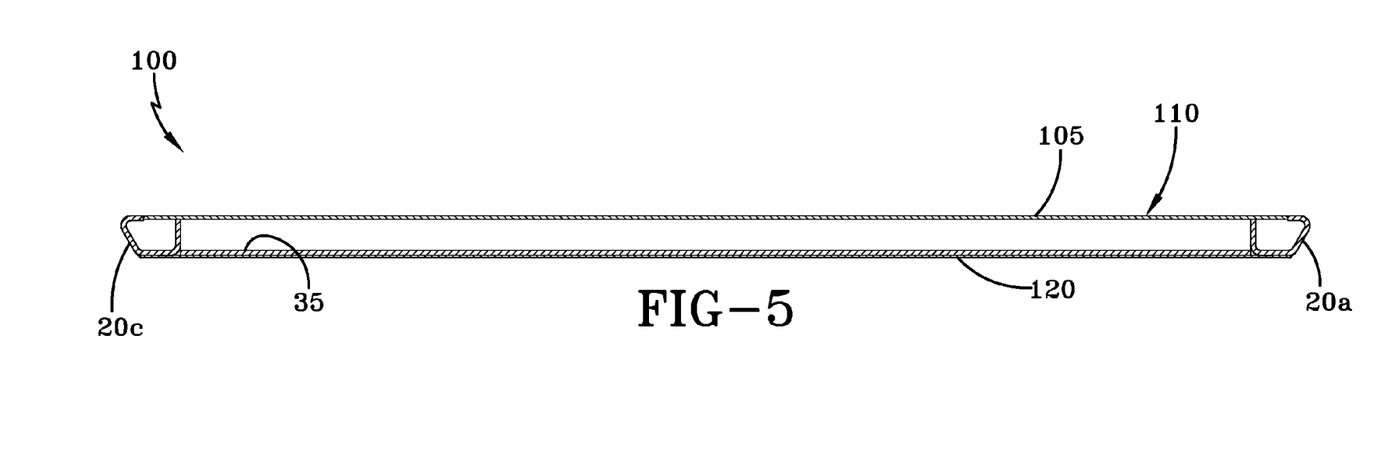
FIG. 5 is a section view similar to that of FIG. 2, but of a slightly different embodiment of a hermetically sealed scale platform of the present invention.
Figure 6:
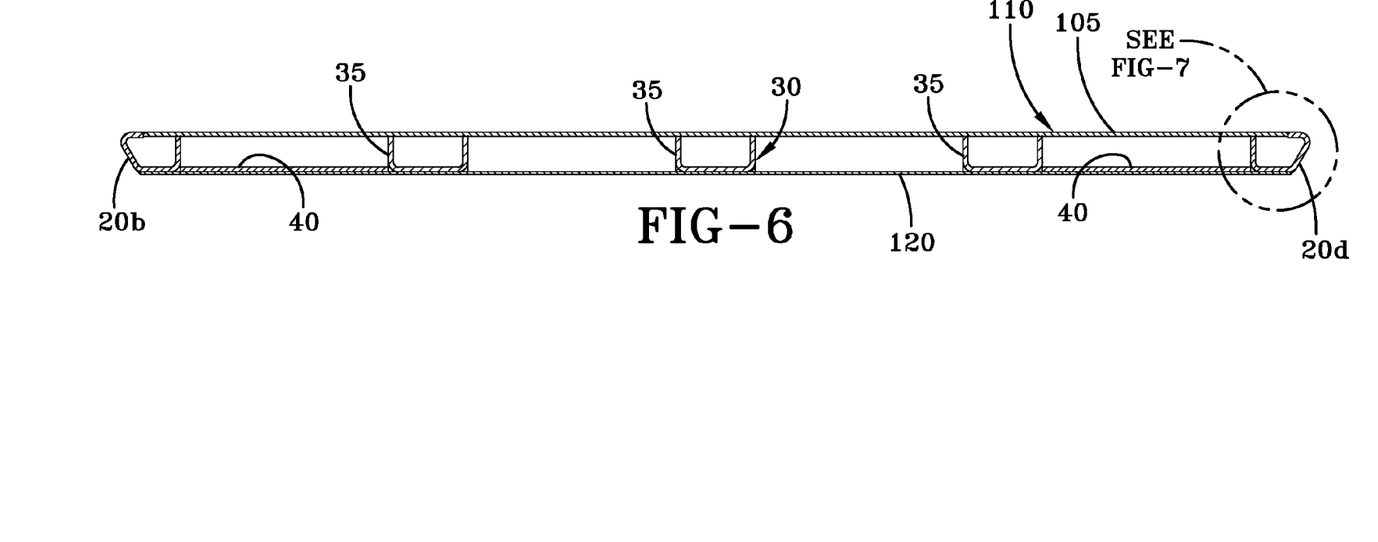
FIG. 6 is a section view similar to that of FIG. 3, but of the hermetically sealed scale platform embodiment of FIG. 5.
Figure 7:
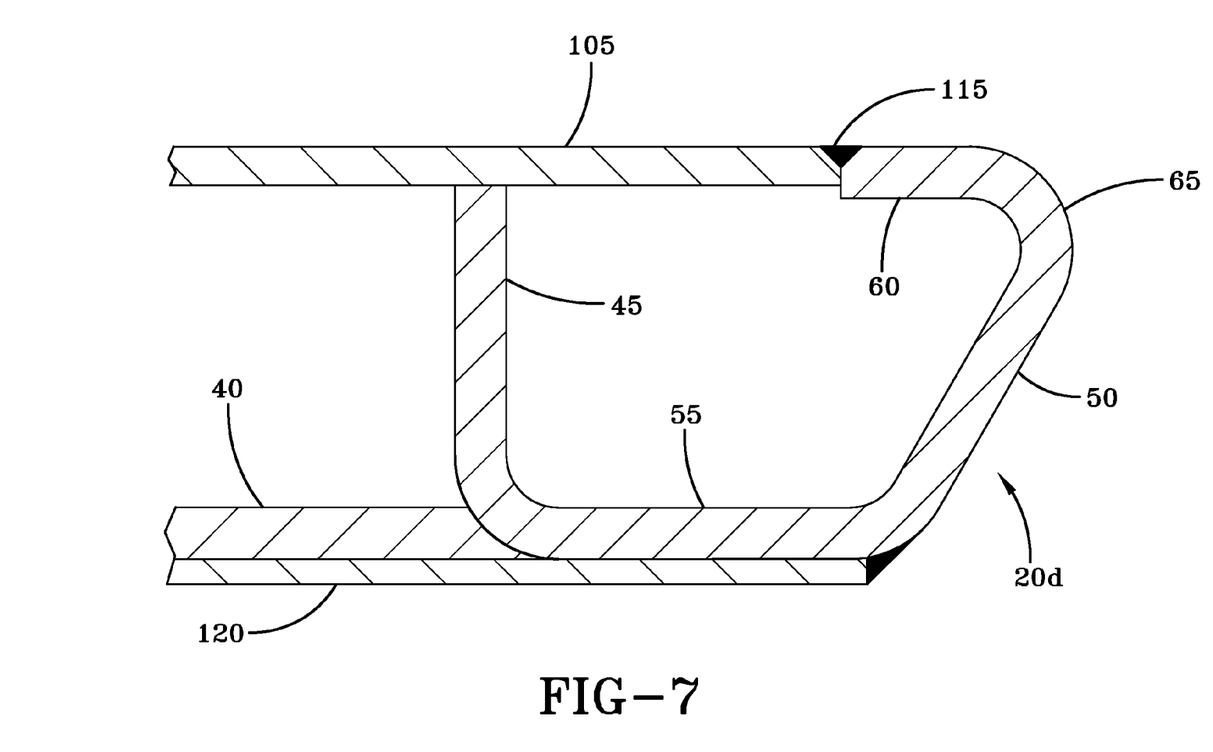
FIG. 7 is an enlarged detail view of a portion of the scale platform as indicated in FIG. 6.

An alternate embodiment of a hermetically sealed scale platform 100 of the present invention is shown in FIGS. 5-7. This embodiment may be similar in construction to the scale platform 5 shown in FIG. 1, or may have an alternate construction, as also described above. Unlike the embodiment of FIGS. 1-4, however, the upper load receiving plate 105 of this platform 100 does not overlap the secondary horizontal legs 60 of the perimeter members 20. Rather, the edges of the upper load receiving plate 105 of this scale 100 abut the inner facing edges of the perimeter member horizontal legs 60.

As illustrated in more detail in FIG. 7, the horizontal legs 60 of the perimeter members 20 and the load receiving plate 105 of this embodiment form a substantially planar load receiving surface 110. The load receiving plate 105 and the perimeter members 20 of this embodiment may be joined by a variety of techniques, such as those disclosed with respect to the above-described platform 5. In the particular example shown, the load receiving plate 105 and perimeter members 20 are joined by a butt weld 115. Alternatively, joining of the load receiving plate 105 and the perimeter members 20 may be accomplished with another bonding material, such as an epoxy or another adhesive. The bottom plate 120 may be attached to the supporting rib structure 15 by any of the techniques described above with respect to the platform 5.

In any event, once the load receiving plate 105 has been attached to the secondary horizontal legs 60 of the perimeter members 20, the welds 115 or other bonding materials are preferably smoothed to produce a flat and unitary load receiving surface 110. Similarly, once the bottom plate 120 has been attached to the rib structure 15, the welds 115 or other bonding materials are preferably smoothed into the contour of the perimeter members. This construction once again results in a platform having a smooth load receiving surface with a rounded perimeter edge 65, which construction eliminates crevices that might allow materials to cling to the platform, facilitates cleaning, and minimizes the chances of product contamination.

Figures 8, 9, 10:
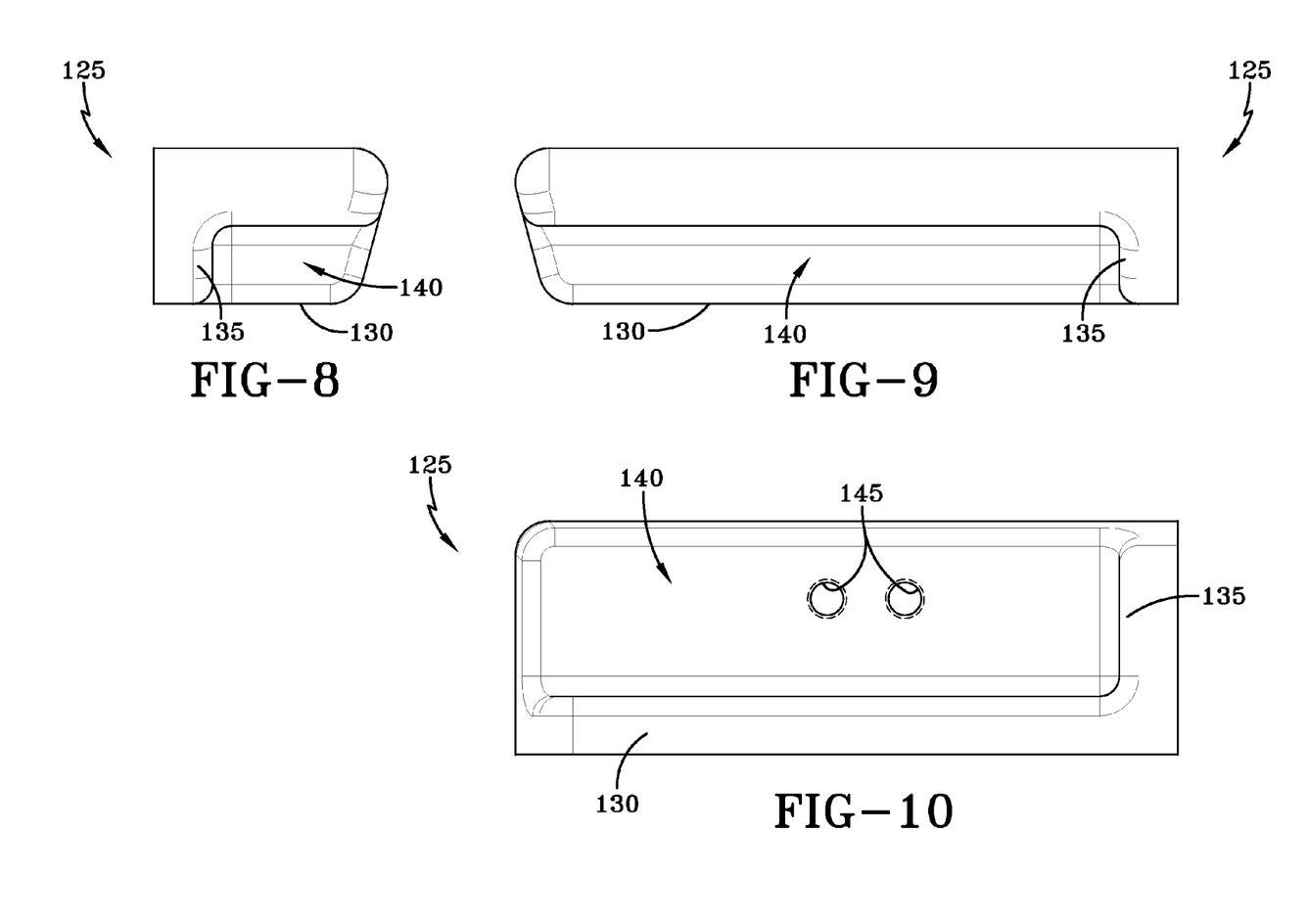
FIGS. 8-10 are end, side and bottom views, respectively, of a load cell mounting element that may be used in a scale platform the present invention.

One exemplary embodiment of a load cell mounting element 125 that may be used with a platform of the resent invention is depicted in FIGS. 8-10. Referring to FIGS. 8-10, in conjunction with FIG. 1, it can be seen that a load cell mounting element 125 may reside at each corner of a platform of the present invention. As can be observed with the most clarity in FIGS. 8-9, the load cell mounting element 125 is preferably provided with the same contour as the perimeter members 20 such that load cell mounting elements can be integrated into the platform structure without altering the contoured shape that provides for the aforementioned advantages. The load cell mounting element 125 thus includes downwardly extending legs 130, 135 along two of its four sides. These legs 130, 135 strengthen the element and provide a connection point for joining of the perimeter members 20 in a sealed manner. The legs 130, 135 also bound a load cell mounting pocket 140 that is designed to partially receive and retain a load cell used with the platform. The load cell mounting pocket 140 may have threaded mounting holes 145 or other elements/structure provided for retaining a load cell. The load cell mounting pocket 140 may be adjusted in dimension to accommodate load cells of different size and to ensure the received load cell is in proper contact with the ground or other surface upon which the associated platform rests during use.

A load cell mounting element 125 of the present invention may be manufactured by any known technique such as, for example, by casting or machining. Preferably, but not necessarily, the load cell mounting element 125 is manufactured from the same material as the perimeter members of the associated platform to facilitate the joining thereof by welding. In such a case, the perimeter members may be welded directly to the corresponding portions of the load cell mounting elements 125, with the load cell mounting elements then forming bottom corner portions of the platform that would otherwise be formed by the perimeter members. In other embodiments, load cell mounting elements 125 of dissimilar material may be employed and may be joined by any suitable technique known in the art. As mentioned above, the contour of the load cell mounting elements 125 preferably mimics the contour of the perimeter members so as to maintain a uniform shape/contour along the sides of the associated platform.

While an exemplary platform of substantially square shape has been shown and described herein for purposes of illustration, it would be obvious to one of skill in the art that scale platforms having other shapes may also be constructed according to the teachings of the present invention. It is noted, however, that a quadrilateral shape allows for a linear welding of the platform perimeter, which lends itself particularly well to various simplified and available mechanical welding processes.

The exemplary scale platform shown and described herein is intended to function as a low-profile platform of a floor scale. However, it should also be obvious that platforms of the same or similar hermetically sealed design can be constructed for other purposes and, therefore, the present invention is not limited to a platform of a specific type. Instead, the size, shape and strength of individual components may be selected as required to produce an assembled platform that is fit for a particular application. Likewise, the particular materials used to construct a platform of the present invention may also vary. While it is contemplated that stainless steel will be frequently selected to comply with the regulations of the various industries within which such scale platforms may find use, other metallic and non-metallic materials having sufficient mechanical (e.g., strength and corrosion-resistance) properties may also be used.

While the specific design, shape and/or size of a scale platform of the present invention may vary, as described above, a scale platform constructed according to the present invention nonetheless provides for a strong, hermetically sealed, lightweight structure, that can be manufactured in an efficient and cost-effective manner. Therefore, while certain exemplary embodiments of a scale platform may be described generally or in detail above, the scope of the present invention is not to be considered limited by such disclosure, and modifications are possible without departing from the spirit of the invention as evidenced by the following claims:

What is claimed is:

1. A hermetically sealed scale platform, comprising:
   a supporting rib structure, said supporting rib structure including a plurality of interior ribs connected to a plurality of perimeter members, said perimeter members forming upstanding sealed sides of said scale platform and including outer vertical legs having a bend near a free end thereof that forms corresponding upper horizontal legs and imparts a rounded exposed perimeter edge to said scale platform;
   a load receiving plate residing atop of and attached to said horizontal legs of said supporting rib structure, said load receiving plate for receiving objects to be weighed; and
   a bottom plate attached to a bottom surface of said supporting rib structure;
   wherein said supporting rib structure, said load receiving plate and said bottom plate cooperate to form a substantially rigid and hermetically sealed sandwich structure; and
   wherein said load receiving plate is attached to said perimeter members of said supporting rib structure in a manner that forms a smooth and blended transition surface therebetween.

2. The scale platform of claim 1, wherein said outer vertical legs of said perimeter members diverge inward from said bend toward said bottom plate.

3. The scale platform of claim 1, wherein perimeter edges of said load receiving plate overlap and are bonded in a sealed manner to said upper horizontal legs of corresponding perimeter members.

4. The scale platform of claim 3, wherein said perimeter edges of said load receiving plate are welded to said upper horizontal legs of corresponding perimeter members and said welds are subsequently shaped to form a smooth transition between the edges of said load receiving plate and said rounded exposed perimeter edge of said perimeter members.

5. The scale platform claim 1, wherein perimeter edges of said load receiving plate abut and are bonded in a sealed manner to corresponding edges of said upper horizontal legs of corresponding perimeter members.

6. The scale platform of claim 5, wherein said perimeter edges of said load receiving plate are welded to abutting edges of said upper horizontal legs of corresponding perimeter members and said welds are subsequently shaped to form a smooth overall receiving surface.

7. The scale platform of claim 1, wherein perimeter edges of said bottom plate are welded to a bottom surface of corresponding perimeter members and said welds are subsequently shaped to form a smooth transition between the edges of said load receiving plate and a corresponding exposed perimeter edge of said perimeter members.

8. The scale platform of claim 1, wherein said bottom plate is adhesively bonded to a bottom surface of corresponding perimeter members.

9. The scale platform of claim 1, further comprising a number of load cell mounting elements interposed between perimeter members, each load cell mounting element provided with substantially the same contour as said perimeter members.

10. The scale platform of claim 9, wherein a load cell mounting element is located at each corner of said scale and has ends of associated perimeter members attached in a sealed manner thereto.

11. A hermetically sealed scale platform, comprising:
a supporting rib structure, said supporting rib structure including a plurality of interior ribs connected to a plurality of perimeter members that form upstanding sealed sides of said scale platform, said perimeter members including outer vertical legs having a bend near a free end thereof that forms an upper horizontal leg, said bend imparting a rounded exposed perimeter edge to said scale platform;
a load receiving plate for receiving objects to be weighed, perimeter edges of said load receiving plate overlapping and welded in a sealed manner to said upper horizontal legs of corresponding perimeter members, said welds subsequently shaped to form a smooth transition between the edges of said load receiving plate and said rounded exposed perimeter edge of said perimeter members; and
a bottom plate attached to a bottom surface of said supporting rib structure;
wherein said supporting rib structure, said load receiving plate and said bottom plate cooperate to form a substantially rigid and hermetically sealed sandwich structure.

12. The scale platform of claim 11, wherein said outer vertical legs of said perimeter members diverge inward from said bend toward said bottom plate.

13. The scale platform of claim 11, wherein perimeter edges of said bottom plate are welded to a bottom surface of corresponding perimeter members and said welds are subsequently shaped to form a smooth transition between the edges of said load receiving plate and a corresponding exposed perimeter edge of said perimeter members.

14. The scale platform of claim 11, further comprising a number of load cell mounting elements interposed between perimeter members, each load cell mounting element provided with substantially the same contour as said perimeter members.

15. The scale platform of claim 14, wherein a load cell mounting element is located at each corner of said scale platform and has ends of associated perimeter members attached in a sealed manner thereto.

16. A hermetically sealed scale platform, comprising:
a supporting rib structure, said supporting rib structure including a plurality of interior ribs connected to a plurality of perimeter members that form upstanding sealed sides of said scale platform, said perimeter members including outer vertical legs having a bend near a free end thereof that forms an upper horizontal leg, said bend imparting a rounded exposed perimeter edge to said scale platform;
a load receiving plate for receiving objects to be weighed, perimeter edges of said load receiving plate abutting and welded in a sealed manner to corresponding edges of said upper horizontal legs of said perimeter members, said welds subsequently shaped to form a smooth to form a smooth overall receiving surface; and
a bottom plate attached to a bottom surface of said supporting rib structure;
wherein said supporting rib structure, said load receiving plate and said bottom plate cooperate to form a substantially rigid and hermetically sealed sandwich structure.

17. The scale platform of claim 16, wherein said outer vertical legs of said perimeter members diverge inward from said bend toward said bottom plate.

18. The scale platform of claim 16, wherein perimeter edges of said bottom plate are welded to a bottom surface of corresponding perimeter members and said welds are subsequently shaped to form a smooth transition between the edges of said load receiving plate and a corresponding exposed perimeter edge of said perimeter members.

19. The scale platform of claim 16, further comprising a number of load cell mounting elements interposed between perimeter members, each load cell mounting element provided with substantially the same contour as said perimeter members.

20. The scale platform of claim 16, wherein a load cell mounting element is located at each corner of said scale and has ends of associated perimeter members attached in a sealed manner thereto.

* * * * *